A. C. GARRATT
VOLTAIC BATTERY.
No. 89,036.  Patented Apr. 20, 1869.
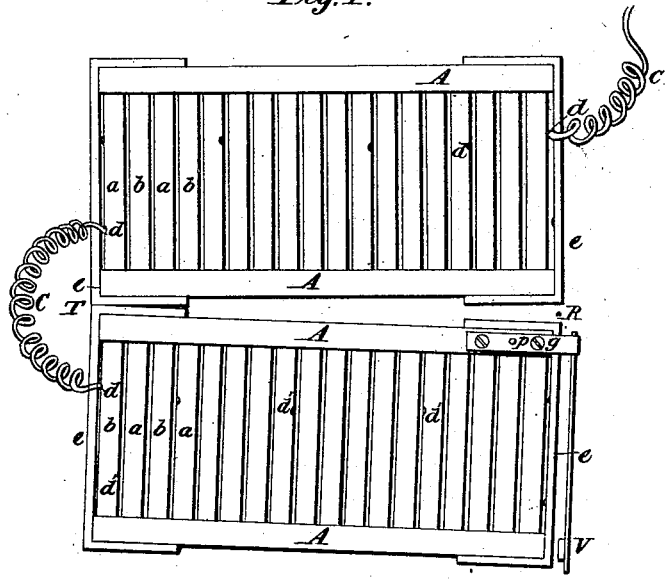
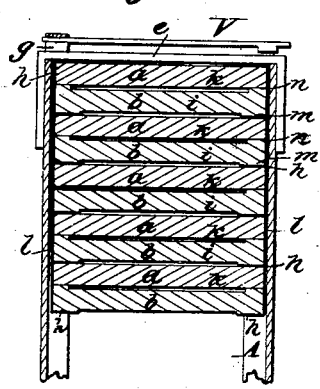
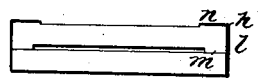
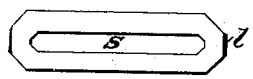
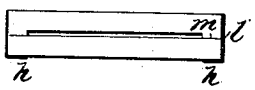
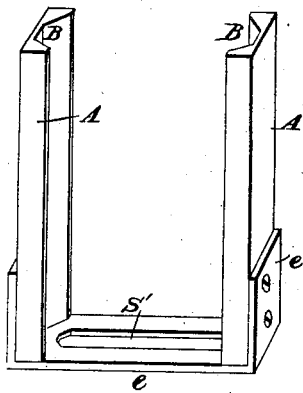
Witnesses:
Eddie Harnden
Mary F. Harnden
Inventor:
Alfred C. Garratt by
Carroll D. Wright, Atty.

United States Patent Office.

ALFRED C. GARRATT, OF BOSTON, MASSACHUSETTS.

*Letters Patent No. 89,036, dated April 20, 1869.*

IMPROVEMENT IN VOLTAIC BATTERY.

The Schedule referred to in these Letters Patent and making part of the same.

*To all whom it may concern:*

Be it known that I, ALFRED C. GARRATT, of Boston, county of Suffolk, and State of Massachusetts, have invented an Improved Double-Bar Battery for the convenient and economical generation of electrical currents at any time and in any place; and I hereby declare the same to be fully described in the following specification, and represented in the accompanying drawings, in which—

Figure 1 is an elevation of my improved double-bar battery, showing the manner of connecting two or more batteries together.

Figure 2 is a sectional plan view of my battery, showing the arrangement of its metallic bars in pairs, with the spaces, shoulders, solderings, and insulations, also vibrator attached.

Figure 3 is a view of one of the metallic bars detached from the frame of the battery, showing solderings, elevations on both ends and both sides of yellow metal bars; this bar is used when it is desired to decompose more metal, for producing a quantity-current.

Figure 4 shows plan view of a bar, giving longitudinal inner space, or slot for generating quantity-currents, by prolonged application of exciting-fluid.

Figure 5 shows a pair of metallic bars detached from frame, as they are made in batteries for intensity, but not particularly quantity-currents.

Figure 6 is a section of the frame of the battery, both sides with metal bars removed; this figure also shows the method of fastening the two sides of the frame together.

The objects of this improved double-bar battery are, to produce a prolonged action by convenient means, to give a quantity-current without greatly increasing the intensity, and to present a better method of connecting two or more batteries together.

This improved battery is an improvement on battery patented by me, December 24, 1867, and July 7, 1868, and was suggested by the fact that I found on more extended experimenting, and further research into the requirements of electro-therapeutics, and the wants of telegraphy and philosophical duties, that the battery already patented was deficient in the requisites above named, and I have succeeded in producing the results I have so laboriously sought.

The nature of my invention consists in an arrangement of metallic bars of dissimilar metals, the bars being rectangular, or any suitable shape, with a slot lengthwise, in order to present more surface of metal, air, and exciting-liquid for decomposition, as well as for furnishing means for prolonging the action of the battery, as will be described, and these particular features constitute the improvement on my battery already patented. The bars used in this improved battery are of copper, bronze, or yellow metal, and zinc, or zinc with magnesium in suitable proportions.

In the drawings—

A is the frame of the battery, which should be made of some strong insulating-material, or wood prepared in paraffine, or otherwise rendered thoroughly insulating.

*a a* show zinc bars, or bars of zinc, magnesium, or zinc and magnesium.

*b b* show bars of copper, bronze, or other metal, dissimilar to zinc or magnesium.

*c* shows coil for connecting two or more batteries together.

*d* represents notch for the attaching of connecting wire, or coil *c*, or conductor-cord, or wire for administering electricity with electrodes, or for connecting wire for any purpose, either medical, experimental, philosophical, or otherwise.

*d' d'* are transverse notches at intervals in the battery, when less power is desired by the use of a less number of pairs between the conductors.

*e* is a metal band, by means of which the frame-pieces A are held firmly together, enclosing the bars of the battery.

*h h* are insulations of gutta-percha, glass, vulcanite, or equivalent insulating-material, to be placed between the pairs of bars.

*i i* show spaces between bars, while *k k* show spaces between the pairs of bars.

*l l* show soldering, by which the bars of each pair are held together.

*m m* show elevations on one side of both ends of copper, brass, or yellow metal bar. This elevation produces the space between bar *a* and bar *b*. On the side of bar *b* opposite *m*, is another elevation *n*, larger than *m*, surmounted on its face by insulation *h*. This elevation *n* is to preserve the space between the pairs of bars, and as it is sometimes necessary to have a wider space, to permit more exciting-fluid to be held between the pairs, or for admitting steam, spray, or vapor, when a greater quantity-current is desired.

The insulation *h* thoroughly insulates one pair of bars from the other.

*s* shows a longitudinal slot in all the bars of this improved battery, while *s'* shows a corresponding slot in band *e*, so that in a battery these slots coming directly in line with each other, form an open space through the entire length of the battery, and the object of this open space is to enable the battery to present more surface of metal to be acted upon by the excitant which may be used, thus securing an increased quantity-current, and this open space through the battery allows of any porous substance, wet with the excitant to be drawn within, to secure a prolonged application of the excitant to all the bars of the battery, and of course securing a prolonged action of the electrical current.

This is very essential in many cases, both for curative and philosophical purposes, especially in telegraphy, and forms the principal feature of the improvements I wish patented.

*v* is a vibrator, which I attach to one end of my battery, to produce a rapid interruption of the current of electricity.

This vibrator, attached by means of band $g$ to frame A on one side, while the free end of vibrator is over the opposite side. In band $g$ is provided a little hole, $p$, for the insertion of the end of the conductor-cord when a rapid interruption of the current is required.

B shows grooves in frame A for the reception of the bars.

In the construction of this battery, each bar of zinc and each bar of copper or other metal, must have metallic connection, thus forming a pair of dissimilar metals. Each pair must be insulated from the next pair by adjusting between their ends, at $h$, as bearings, bits of rubber cloth, or other insulator, and these pairs are held in frame A, as described.

The spaces between the bars and between the pair of bars, serve to hold the exciting-fluid, and establish a current from pair to pair, and to admit vapor, steam, or spray.

In laying up my battery, the grooves B, which are made to receive the ends of the bars, must be well smeared in soft rubber, as also the ends of the bars previously soldered together into pairs, then pile up the pairs, insulating them as described, and hold all together with bands $e$.

I use cast bars of metals in this improved battery, because rolled, or otherwise wrought metals are more compacted in their particles, and are less susceptible to the action of the excitant, especially when a quantity as well as an intensity-current is required, but I may use rolled or wrought metals for ordinary purposes.

I construct my batteries with the first bar of zinc, and the last of the dissimilar metal, or the reverse, so that when I use two or more batteries together, I keep up the alternating of bars, that is, I use single bars of dissimilar metals on each end. Now, if I wish to connect two or more batteries, I place them in the position shown in fig. 1, allowing the corners to touch at T, but having the opposite ends open slightly at R. The first bar of one battery is of brass or yellow metal, while of the other battery it is zinc or magnesium or zinc and magnesium. Thus I preserve my pairs.

If the ends were not separated at R, there would be no action, the current of one battery neutralizing that of the other.

The connecting-wire, or coil $c$ is attached at $d$, in each battery, thus preserving the influence of the first bars of each battery, and making the necessary pair.

To increase the quantity of current, I increase the amount of metal-surface exposed, and prolong the action of excitants, by means of the longitudinal opening $s$, heretofore described, thereby inducing more vapor, air, and metal to be decomposed.

For an exciting-fluid, I may use spray, steam, or vapor, which may be of water and air, vinegar, sea-water, or any weak acid, or chemical solution, injected through the spaces $s$, and spaces $i$ and $k$.

I do not confine myself to any size of bars or complete batteries, nor to any particular shape of the bars, provided they are arranged as I have described.

I do not claim the invention of a vibrator or interrupter described, nor the joining of two or more batteries together to increase the electrical effect, as the first is old, and the last simply increases the power of what I already have; but

What I claim as an improvement on my inventions patented December 24, 1867, and July 7, 1868, and desire to secure by Letters Patent, is—

In a voltaic pile, constructed substantially as described, slotted bars, constructed as and for the purposes set forth.

In testimony whereof, I have signed my name to this specification, in the presence of two subscribing witnesses.

ALFRED C. GARRATT.

Witnesses:
CARROLL D. WRIGHT,
EDDIE HARNDEN.